United States Patent Office 3,428,668
Patented Feb. 18, 1969

3,428,668
PROCESS FOR THE PREPARATION OF 1,4-CYCLOHEXANE DICARBOXYLIC ACID DIALKYL ESTERS
Hans-Leo Huelsmann, Witten-Rudinghausen, and Gustav Renckhoff, Witten-Ruhr, Germany, assignors to Chemische Werke Witten G.m.b.H., Witten-Ruhr, Germany
No Drawing. Filed Feb. 20, 1963, Ser. No. 260,043
Claims priority, application Germany, Feb. 23, 1962,
C 26,307
U.S. Cl. 260—468                             5 Claims
Int. Cl. C07c 61/08, 69/24

The present invention relates to a process for the preparation of 1,4-cyclohexane dicarboxylic acid dialkyl esters.

It is known to prepare 1,4-cyclohexane dicarboxylic acid dimethyl esters by hydrogenation of terephthalic acid dimethyl esters in a pure 99% acetic acid solution in the presence of platinum oxide (Helv. Chim. Acta, 21, 1938, page 141). This process is, however, expensive to use because of the costs of the platinum oxide, and, additionally, because of the inconvenience of working with glacial acetic acid as the solvent.

It is also known to prepare 1,4-cyclohexane dicarboxylic acid dialkyl esters by hydrogenation of the corresponding terephthalic acid dialkyl esters with hydrogen under high pressure and at high temperatures in the presence of nickel catalysts (J. Am. Chem. Soc., 81, 1959, page 5394). However, a reduction of only one of the two ester groups to the methyl group occurs thereby to a much greater extent than during the hydrogenation of the o- and m-benzene dicarboxylic acid dialkyl esters which are hydrogenated under analogous conditions practically quantitatively to the corresponding 1,2- and, respectively, 1,3-cyclohexane dicarboxylic dialkyl esters (U.S. Patent 2,070,770). Up to about 25% of the terephthalic acid dialkyl ester employed passes over into p-toluic acid alkyl esters and 4-methylcyclohexane carboxylic acid alkyl esters. This constitutes a considerable loss of the valuable 1,4-cyclohexane dicarboxylic acid esters. Additionally, the hydrogenation frequently comes to a standstill before the entire terephthalic acid ester employed has been hydrogenated. Also, the addition of low molecular weight alkanols does not lead to an increase in the yield of 1,4-cyclohexane dicarboxylic acid dialkyl esters (J. Pharm. Soc. Japan, 76, 1956, pages 954–955; referred to in C.A., vol. 51, 1957, column 2589c).

It has now been found in accordance with the present invention that 1,4-cyclohexane dicarboxylic acid dialkyl esters of monohydric alkanols having up to 5 carbon atoms may be prepared, with elimination of the formation of undesirable monofunctional esters, in a practically quantitative yield when the hydrogenation of the corresponding terephthalic acid dialkyl ester is conducted with the addition of at least 10% by weight, preferably 15 to 25% by weight, based on the amount of terephthalic acid dialkyl ester employed, of p-toluic acid alkyl ester and/or 4-methyl cyclohexane carboxylic acid alkyl ester at temperatures of from 150–250° C., preferably 160 to 200° C., and hydrogen pressures of from 20 to 300 atmospheres, preferably 100 to 200 atmospheres, in the presence of a metallic hydrogenation catalyst, except the noble metals, preferably nickel, on a silicate carrier material. The use of the above mentioned amounts of monofunctional esters results in the technical advance of the present invention and simultaneously assures a favorable space-time yield. The catalyst quantity to be employed according to the present invention amounts to 0.1 to 5.0%, by weight, based on the amount of terephthalic acid dialkyl ester used.

The hydrogenation of the terephthalic acid dialkyl ester in mixture with the monofunctional esters may also be carried out, if desired, in the presence of 10 to 50% by weight, based on the amount of terephthalic acid dialkyl ester to be hydrogenated, of monohydric alkanols, whereby it is expedient to use that alkanol which is present in the respective terephthalic acid dialkyl ester. Because of the alkanol addition under the reaction conditions employed, the hydrolysis of the ester is repressed due to the low water amounts which arise as a consequence of the reduction of ester groups.

The hydrogenation according to the process of the present invention may be carried out batchwise or in a continuous process.

The 1,4-cyclohexane dicarboxylic acid dialkyl esters prepared in accordance with the present invention are, for example, valuable intermediate products for the preparation of starting materials for the fiber and synthetics industry.

Accordingly, it is the primary object of the present invention to provide an improved process for the production of 1,4-cyclohexane dicarboxylic acid dialkyl esters.

Other objects of the present invention will become apparent hereinafter from the following examples which serve to illustrate the process without, however, limiting the same.

Example I

A mixture of 1,000 parts by weight of terephthalic acid dimethyl ester, 44 parts by weight of 4-methylcyclohexane carboxylic acid methyl ester, 102 parts by weight of p-toluic acid methyl ester, 250 parts by volume of methanol, and 50 parts by weight of a Ni carrier catalyst with a nickel content of 25% by weight are heated to 160° C in an autoclave equipped with stirrer. After this temperature has been reached, hydrogen is added thereto under a pressure of 200 atmospheres. A brisk hydrogen absorption commences while the temperature rises to 190° C. and heating of the autoclave is throttled. The starting pressure is restored in intervals of 15 minutes each. The hydrogen absorption is completed after 3 hours. The autoclave is cooled, relieved of pressure and the contents thereof filtered. The easily movable, colorless filtrate is freed from methanol and subsequently distilled in vacuo. After distillation of the preliminary run which consist of 98 parts by weight of 4-methylcyclohexane carboxylic acid methyl ester with a B.P.$_{15}$ of 78° to 85° C. and 53 parts by weight of a fraction boiling up to 139° C. at 15 torr and containing predominantly p-toluic acid methyl ester, 998 parts by weight of pure cis-trans-1,4-cyclohexane dicarboxylic acid dimethyl ester pass over, having a B.P.$_{15}$ of 139° to 142° C. The acid number of this product is 0.4, and the saponification number is 559 (calculated=560). The yield corresponds to 96.8% of the theoretical, based on the amount of terephthalic acid dimethyl ester employed.

Example II

A mixture of 1,000 parts by weight of terephthalic acid dimethyl ester, 150 parts by weight of p-toluic acid methyl ester, 250 parts by volume of methanol, and 50 parts by weight of a Ni carrier catalyst which contains 25% by weight of metallic Ni is hydrogenated in an autoclave equipped with stirrer at 160° to 190° C. and 140 atmospheres of hydrogen pressure. A brisk hydrogen absorption commences. At 15 minute intervals, the starting pressure is restored by supplying additional hydrogen. The hydrogen absorption is completed after 3½ hours. After filtration of the catalyst, the hydrogenation product is freed from methanol and subsequently distilled in vacuo. After distillation of 175 parts by weight of a preliminary run within the boiling limits of from 78° to 138° C. at 15 torr, 993 parts by weight of pure cis-trans-1,4-cyclohexane dicarboxylic acid dimethyl ester are obtained, having a B.P.$_{15}$ of 139° to 142° C. The acid number of the ester is 0.5, and the saponification number is 560 (calculated=560). The yield corresponds to 96.3% of the theoretical, based on the amount of terephthalic acid dimethyl ester employed.

Example III illustrates a known prior art process for the preparation of 1,4-cyclohexane dicarboxylic acid dimethyl ester, wherein the terephthalic acid dimethyl ester is hydrogenated in the presence of the same catalyst as used in Example I, but without the addition of p-toluic acid methyl ester, 4-methylcyclohexane carboxylic acid methyl ester and methanol.

Example III 1,000 parts by weight of terephthalic acid dimethyl ester are hydrogenated in the presence of 50 parts by weight of the Ni carrier catalyst, as also used in Example I, under the conditions set forth therein until no further hydrogen absorption takes place. In the preliminary run, there are obtained 37.8 parts by weight of 4-methylcyclohexane carboxylic acid methyl ester with the boiling interval of from 76° to 90° C. at 16 torr and 94.6 parts by weight of p-toluic acid methyl ester fraction with the boiling interval of from 90° to 126° C. at 14 torr. After an intermediate run to 137° C. at 14 torr, 672 parts by weight of cis-trans-1,4-cyclohexane dicarboxylic acid dimethyl ester pass over at from 137° to 140° C. and at 14 torr. The acid number of the ester is 1.7, and the saponification number 554 (calculated=560). 148.5 parts by weight of unchanged terephthalic acid dimethyl ester are recovered. The yield of 1.4-cyclohexane dicarboxlic acid dimethyl ester amounts to 76.6% of the theoretical, based on the amount of terephthalic acid dimethyl ester reacted.

Example IV

A mixture of 600 parts by weight of terephthalic acid dibutyl ester, 120 parts by weight of 4-methylcyclohexane carboxylic acid butyl ester, 300 parts by weight of butanol and 24 parts by weight of a Ni carrier catalyst with a metallic nickel content of 25% by weight is hydrogenated in an autoclave equipped with stirrer at 150–160° C. and a hydrogen pressure of 150 atmospheres. During the hydrogenation the starting pressure is restored in intervals of 15 minutes each by further additions of hydrogen. After 3½ hours there is no further drop in pressure. The autoclave is cooled, relieved of pressure and the hydrogenation product filtered. During distillation after distilling off the butanol and 4-methylcyclohexane carboxylic acid butyl ester, 594 parts by weight of pure cis-trans-1,4-cyclohexane dicarboxylic acid dibutyl ester pass over at 182–185° C. at 7 torr. The acid number is 0.7; the saponification number is 393 (calculated=394.5). The yield of 1,4-cyclohexane dicarboxylic acid dibutyl ester corresponds to 96.9% of the theoretical, based on the amount of terephthalic acid dibutyl ester employed.

While the invention has been described with reference to a number of Examples thereof, it will be understood that changes may be made in carrying out the process without departing from the scope of the invention, and it is intended that all matter contained in the above description shall be interpreted as illustrative and not in a limiting sense.

We claim:
1. In a process for the preparation of a 1,4-cyclohexane dicarboxylic acid dialkyl ester of an alkanol selected from the group consisting of monohydric alkanols having up to 5 carbon atoms by hydrogenation of the corresponding terephthalic acid dialkyl ester at a temperature of between approximately 150° and 250° C. and a hydrogen pressure of between approximately 20 and 300 atmospheres in the presence of between approximately 0.1 and 5.0% by weight of a nickel catalyst on a mineral carrier material, the improvement which comprises carrying out said hydrogenation in the presence of at least 10% by weight of a compound selected from the group consisting of p-toluic acid alkyl esters, 4-methylcyclohexane carboxylic acid alkyl esters and mixtures thereof, whereby substantially quantitative yields of said 1,4-cyclohexane dicarboxylic acid dialkyl ester are obtained.

2. In a process for the preparation of a 1,4-cyclohexane dicarboxylic acid dialkyl ester of an alkanol selected from the group consisting of monohydric alkanols having up to 5 carbon atoms by hydrogenation of the corresponding terephthalic acid dialkyl ester at a temperature of between approximately 150° and 250° C. and a hydrogen pressure of between approximately 20 and 300 atmospheres in the presence of between approximately 0.1 and 5.0% by weight of nickel and in the presence of between approximately 10 and 50% by weight of a monohydric alkanol, based on the amount of terephthalic acid dialkyl ester employed, the improvement which comprises carrying out said hydrogenation in the presence of at least 10% by weight of a compound selected from the group consisting of p-toluic acid alkyl esters, 4-methylcyclohexane carboxylic acid alkyl esters and mixtures thereof, whereby substantially quantitative yields of said 1,4-cyclohexane dicarboxylic acid dialkyl ester are obtained.

3. Process according to claim 1, wherein the hydrogenation is carried out in the presence of between approximately 10 and 50% by weight of a monohydric alkanol, based on the amount of terephthalic acid dialkyl ester employed.

4. Process according to claim 1, wherein the hydrogenation temperature is between approximately 160° and 200° C. and the hydrogen pressure is between approximately 100 and 200 atmospheres.

5. Process according to claim 1, wherein said compound is added to the reaction mixture in amounts of between approximately 15 and 25% by weight.

References Cited

UNITED STATES PATENTS 2,070,770   2/1937   Amend _____ 260—468
3,027,398   3/1962   Foohey _____ 260—468

LORRAINE A. WEINBERGER, *Primary Examiner.*

P. J. KILLOS, *Assistant Examiner.*